United States Patent
Boone et al.

(10) Patent No.: US 9,051,062 B1
(45) Date of Patent: Jun. 9, 2015

(54) ASSEMBLY USING SKELETON STRUCTURE

(71) Applicant: Cessna Aircraft Company, Wichita, KS (US)

(72) Inventors: Richard Boone, Wichita, KS (US); Benjamin De Putter, Maize, KS (US)

(73) Assignee: Textron Innovations, Inc., Providence, RI (US)

( * ) Notice: Subject to any disclaimer, the term of this patent is extended or adjusted under 35 U.S.C. 154(b) by 160 days.

(21) Appl. No.: 13/763,427

(22) Filed: Feb. 8, 2013

Related U.S. Application Data

(60) Provisional application No. 61/596,644, filed on Feb. 8, 2012.

(51) Int. Cl.
| | |
|---|---|
| *B64C 1/00* | (2006.01) |
| *B64F 5/00* | (2006.01) |
| *B29C 65/00* | (2006.01) |
| *B64C 1/06* | (2006.01) |

(52) U.S. Cl.
CPC ......... *B64F 5/0009* (2013.01); *B29C 66/73753* (2013.01); *B64C 1/061* (2013.01); *B64C 1/069* (2013.01); *B64C 1/064* (2013.01); *B64C 2001/0072* (2013.01)

(58) Field of Classification Search
CPC ........ B64C 1/061; B64C 1/064; B64C 1/069; B64C 2001/0072; B29C 65/483; B29C 65/7808; B29C 66/73753; B64F 5/0009
USPC ................... 156/307.1, 307.7, 293, 285, 245; 244/119
See application file for complete search history.

(56) References Cited

U.S. PATENT DOCUMENTS

| | | | | |
|---|---|---|---|---|
| 4,740,540 | A | * 4/1988 | Kameda et al. | 523/457 |
| 4,770,929 | A | 9/1988 | Nobumasa et al. | |
| 4,833,029 | A | 5/1989 | DuPont et al. | |
| 5,123,985 | A | 6/1992 | Evans et al. | |
| 5,223,067 | A | * 6/1993 | Hamamoto et al. | 156/173 |
| 5,242,523 | A | 9/1993 | Willden | |
| 5,368,807 | A | 11/1994 | Lindsay | |
| 5,448,505 | A | * 9/1995 | Novak | 702/170 |
| 5,562,796 | A | 10/1996 | Ertl | |
| 5,604,010 | A | 2/1997 | Hartz et al. | |
| 5,707,576 | A | 1/1998 | Asher | |
| 6,128,998 | A | 10/2000 | Freitas et al. | |
| 6,458,309 | B1 | 10/2002 | Allen et al. | |
| 6,589,472 | B1 | 7/2003 | Benson et al. | |
| 6,613,258 | B1 | * 9/2003 | Maison et al. | 264/102 |

(Continued)

OTHER PUBLICATIONS

Office Action in related U.S. Appl. No. 12/829,234 dated Jan. 3, 2011, 10 pages.

(Continued)

*Primary Examiner* — John Goff
(74) *Attorney, Agent, or Firm* — Lathrop & Gage LLP

(57) ABSTRACT

A method for making a fuselage section comprises the steps of assembling a support system. The support system comprises fiber reinforced composite material and includes at least three frames and six stringers. The support system is partially cured via a fast cure process such that the support system attains about eighty percent of its fully cured strength. A skin comprising uncured fiber reinforced composite material is globally positioned such that an inner surface of the skin corresponds to an outer surface of the support system. The skin and the support system are fully cured together. The support system is assembled on a bonding tool having a bonding surface corresponding to an inner surface of the skin.

6 Claims, 10 Drawing Sheets

(56) References Cited

U.S. PATENT DOCUMENTS

| | | | |
|---|---|---|---|
| 6,632,502 | B1 | 10/2003 | Allen et al. |
| 6,866,738 | B2 * | 3/2005 | Sato ............................ 156/222 |
| 7,410,352 | B2 * | 8/2008 | Sarh ............................ 425/317 |
| 2002/0006523 | A1 | 1/2002 | Obeshaw |
| 2002/0071920 | A1 | 6/2002 | Obeshaw |
| 2003/0082385 | A1 | 5/2003 | Li et al. |
| 2003/0168555 | A1 | 9/2003 | Livi et al. |
| 2003/0198775 | A1 | 10/2003 | Roth et al. |
| 2004/0115299 | A1 | 6/2004 | Potter et al. |
| 2004/0175555 | A1 | 9/2004 | Ogisu |
| 2005/0183808 | A1 | 8/2005 | Barguet et al. |
| 2005/0183818 | A1 | 8/2005 | Zenkner et al. |
| 2006/0006599 | A1 | 1/2006 | Shahidi et al. |
| 2006/0049552 | A1 | 3/2006 | Fish |
| 2006/0254710 | A1 | 11/2006 | Jung et al. |
| 2008/0083494 | A1 | 4/2008 | Sander et al. |
| 2008/0265093 | A1 | 10/2008 | Lopez et al. |
| 2009/0020645 | A1 | 1/2009 | Cacciaguerra |
| 2009/0074905 | A1 | 3/2009 | Matsen et al. |
| 2009/0261199 | A1 | 10/2009 | McCarville et al. |
| 2009/0263618 | A1 | 10/2009 | McCarville et al. |
| 2009/0283638 | A1 | 11/2009 | Arevalo Rodriguez et al. |
| 2009/0320398 | A1 | 12/2009 | Gouvea |
| 2010/0098910 | A1 | 4/2010 | Naritomi et al. |
| 2010/0159189 | A1 | 6/2010 | Takagi et al. |
| 2011/0045232 | A1 | 2/2011 | Kismarton |
| 2011/0097554 | A1 | 4/2011 | Kehrl et al. |

OTHER PUBLICATIONS

Response to Office Action in related U.S. Appl. No. 12/829,234 dated Mar. 18, 2011, 10 pages.
Office Action in related U.S. Appl. No. 12/829,234 dated Mar. 31, 2011, 13 pages.
Office Action in related U.S. Appl. No. 12/779,706 dated Aug. 1, 2011, 18 pages.
Notice of Allowance issued in related U.S. Appl. No. 12/779,706 dated Jan. 26, 2012, 9 pages.
Notice of Allowance issued in related U.S. Appl. No. 12/829,234 dated Jan. 19, 2013, 15 pages.

* cited by examiner

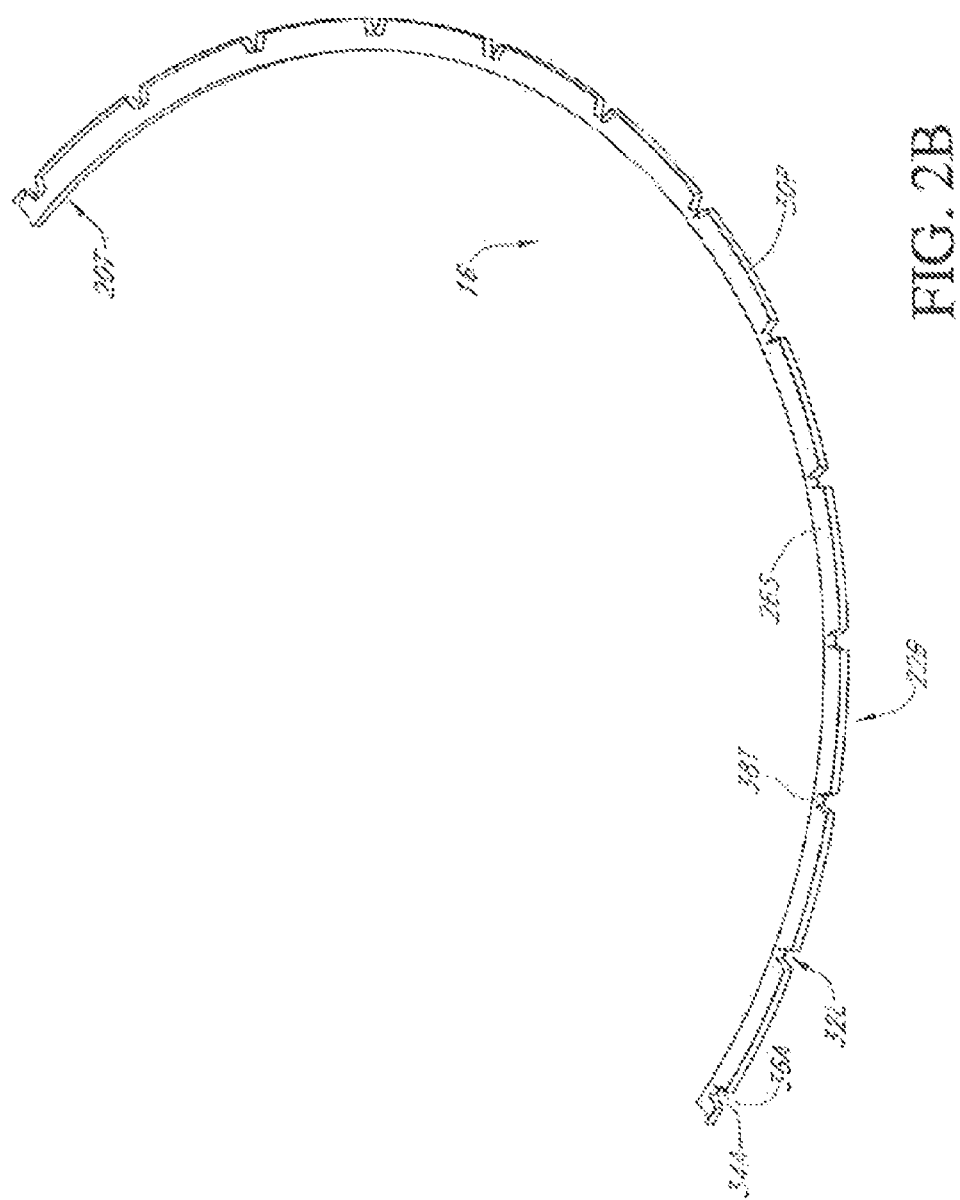

ASSEMBLY USING SKELETON STRUCTURE

CROSS-REFERENCE TO RELATED APPLICATIONS

This application claims priority to U.S. Provisional Patent Application Ser. No. 61/596,644 filed Feb. 8, 2012, the disclosure of which is incorporated herein by reference in its entirety.

BACKGROUND OF THE INVENTION

1. Field of the Invention

The invention relates generally to the field of fabricating composite structures. More specifically, the invention relates to the field of manufacturing composite structures for aircraft.

2. Description of the Related Art

The disclosed embodiments provide systems and methods for fabricating with composite material the fuselage of an aircraft, among other structures. The fuselage of an aircraft is the hollow body of an aircraft, and may comprise a skin. Structural members such as stringers and frames may be fastened or otherwise secured to the inner surface of the skin to provide structural integrity to the fuselage. Numerous aircraft parts, such as the wings, the landing gear, et cetera, may be secured to the fuselage. Proper and efficient fabrication of the fuselage is therefore of prime importance in the construction of an aircraft.

The fuselage of an aircraft, including its structural supporting members, is customarily made of aluminum or other metals. A fuselage made from metal, however, is generally heavy and excessively thick, and may cause unwanted drag during flight. More recently, thus, many aircraft manufacturers are fabricating the entire fuselage or some of its components with composite material.

FIG. 1 shows a section of a fuselage section 10 made of composite material. The fuselage 10 has a curved skin 12 to which stringers 14 and frames 16 are bonded or otherwise secured. Securement of the stringers 14, frames 16 (and other structural members of the fuselage 10) to the skin 12 has heretofore been a laborious process, and has generally been effectuated in one of three ways. Specifically, the skin 12, the stringers 14, and the frames 16 may be independently fabricated with composite material. Each stringer 14 and frame 16 may then be bonded to the skin 12 piece by piece. As can be appreciated, this process may require individual tooling for the securement of each component 14, 16, to the skin 12, which may be fairly time consuming. Alternatively, bond mandrels may be used to co-cure some of the components 14, 16 to the skin 12. The mandrels may have to be removed after curing, and other parts may have be cured to the skin 12 at locations previously occupied by the mandrels. Or, extensive positional tooling may be used to co-cure the components 14, 16, and the skin 12 all at once. Configuration of such extensive tooling may be an arduous task and require much labor.

U.S. Pat. No. 5,242,523 to Willden et al., discloses a method whereby uncured stiffeners and pre-cured frame members are laid on the surface of the skin. A flexible caul is placed between every set of two frame members, and an elongated mandrel is placed under each stiffener. The cauls define the outer shape of the structure, and the mandrels define the inner shape of the structure. The entire structure is placed within a vacuum bag. During this co-curing, the bag presses the frame members against the skin panels, and presses the cauls causing them to press the stiffeners against the skin panel, thus forming the finished structure.

U.S. Pat. No. 8,220,154 to Cacciaguerra discloses the use of "shell tooling" for fabricating the fuselage. The frames and structural parts are assembled around a chuck resting on a frame structure. Shell fixtures are then installed in spaces between the frames, and fastened to the frames by detachable fasteners. The shell fixtures have to be removed after the skin is coupled to the framework.

SUMMARY

Methods for conveniently forming composite structures, such as fuselages of aircraft, are disclosed herein. According to one embodiment, a method for eliminating use of extensive positional tooling during construction of a fuselage section comprises the steps of forming a first frame, a second frame, and a third frame by partially curing a composite material. Each of the first, second and third frames have a plurality of locking features molded therein. A first stringer, a second stringer, and a third stringer is formed by partially curing the composite material. Each of the first, the second, and the third stringers have angled surfaces corresponding to the locking features. A solitary bonding tool having a curved bonding surface is provided, and each of the first, the second, and the third frames are located in a parallel configuration on the bonding surface. A support system is formed by securing using adhesive the first, the second, and the third frames to each of the first, second, and third stringers such that the angled surfaces of each of the first, second, and third stringers are in contact with one locking feature of each of the first, second, and third frames. A skin for the fuselage section is provided. The skin comprises composite material and is uncured. The skin is located with the support system such that an outer surface of the support system is in contact with an inner surface of the skin. The skin and the support system are then fully cured to form the fuselage section. A shape of the bonding surface corresponds to the shape of an inner surface of the skin.

According to another embodiment, a method for making a fuselage section comprises the steps of assembling a support system. The support system comprises fiber reinforced composite material and includes at least three frames and six stringers. The support system is partially cured via a fast cure process such that the support system attains about eighty percent of its fully cured strength. A skin comprising uncured fiber reinforced composite material is globally positioned such that an inner surface of the skin corresponds to an outer surface of the support system. The skin and the support system are fully cured together. The support system is assembled on a bonding tool having a bonding surface corresponding to an inner surface of the skin.

According to yet another embodiment, a method for constructing a fuselage section comprises the step of forming a plurality of frames by partially curing a composite material. Each of the frames has a plurality of locking features molded therein. A plurality of stringers are formed by partially curing the composite material. Each stringer has angled surfaces corresponding to the locking features. A bonding tool having a plurality of attachment members is provided. Each attachment member has a curved bonding surface with ridges extending partially therethrough. Each frame is removably secured to a different attachment member such that at least one of the locking features of each frame is adjacent one ridge. A support system is formed on the tool by securing stringers to the frames such that at least one of the locking features of each frame is adjacent one ridge. A skin for the fuselage is provided. The skin comprises uncured composite material. The skin is positioned atop the support system. The uncured skin and the partially cured support system are fully cured together. A shape of the bonding surface of each attachment member corresponds to a shape of an inner surface of the skin.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 2B is another perspective view of the frame of FIG. 2A;

DETAILED DESCRIPTION

Embodiments of the present invention provide systems and a method for constructing and assembling a fuselage of an aircraft. The systems and methods disclosed herein may also be used to fabricate and assemble composite structures for automobiles, boats, wind turbines, et cetera. Unless otherwise noted or as would be inherent, the followings terms when used in the disclosure will have the following meaning.

DEFINITIONS

Bonding: Bonding is the assembly of two or more cured or partially cured parts. Bonding may require surface preparation of each faying surface, and additional adhesive.

Co-bonding: Co-bonding is the assembly of two or more parts with at least the faying surfaces being uncured or partially cured and wherein prepreg materials requiring surface preparation can be bonded to cured components. The use of adhesive for co-bonding is optional.

Co-curing: Co-curing is the curing and/or assembly of two or more parts in which at least one of the parts has not previously been cured fully. The use of adhesive during co-curing is optional.

Curing: Curing is to toughen or harden material (e.g., thermoset resin formulations) by heat, radiation, chemical additives, et cetera. As used herein, curing is to cure a single component in an autoclave or oven, for example.

Bond line thickness: The gap between the bonded surfaces of the two parts.

Composite material: Material made from two or more constituent materials having different physical or chemical properties, which, when combined, produce the composite material having characteristics different from the individual constituent materials.

Prepreg: A fibrous material pre-impregnated with a particular synthetic resin and formed into sheets or strips.

Description

Figure 1:
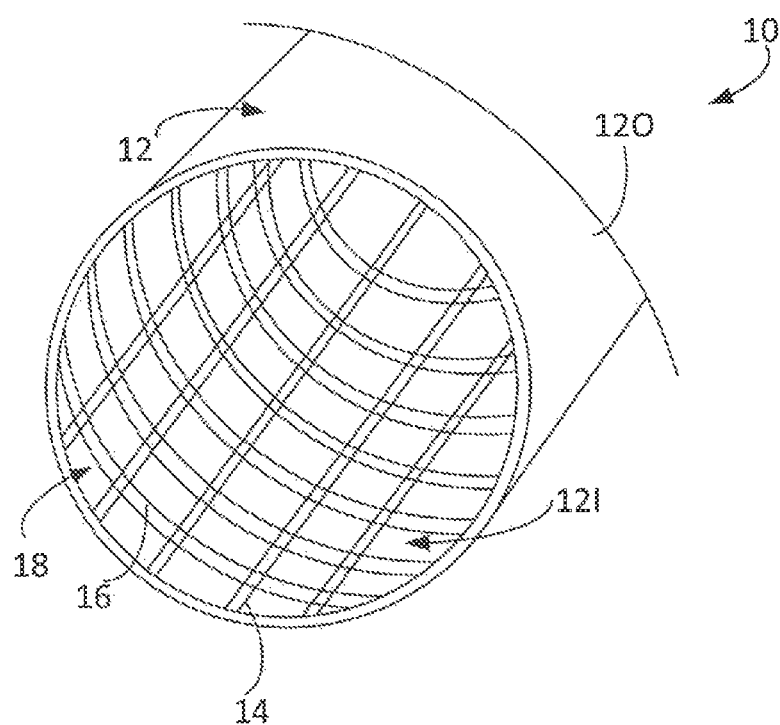
FIG. 1 is a perspective view of a prior art fuselage section.

FIG. 1 shows a fuselage section 10 made of composite material and having a curved skin 12. The skin 12 may have an inner surface 12I and an outer surface 12O. Stringers 14 and frames 16 may be bonded or otherwise secured to the inner surface 12I of the skin 12. The stringers 14 (which may also be referred to as longerons or stiffeners) and frames 16 may form a support system 18 for transferring and absorbing aerodynamic loads acting on the skin 12. The support system 18 as outlined herein comprises a plurality of stringers 14 and frames 16. People of skill in the art will appreciate, however, that the support system 18 may include other components (e.g., ribs, spars, et cetera). Further, while the fuselage section 10 depicted in FIG. 1 is labeled as prior art, people of skill in the art when given the benefit of this disclosure will appreciate that the method of forming the fuselage section 10 in line with the teachings of the current invention is new. The support system 18 may also be referred to herein as the "skeleton structure 18."

Figure 2A:
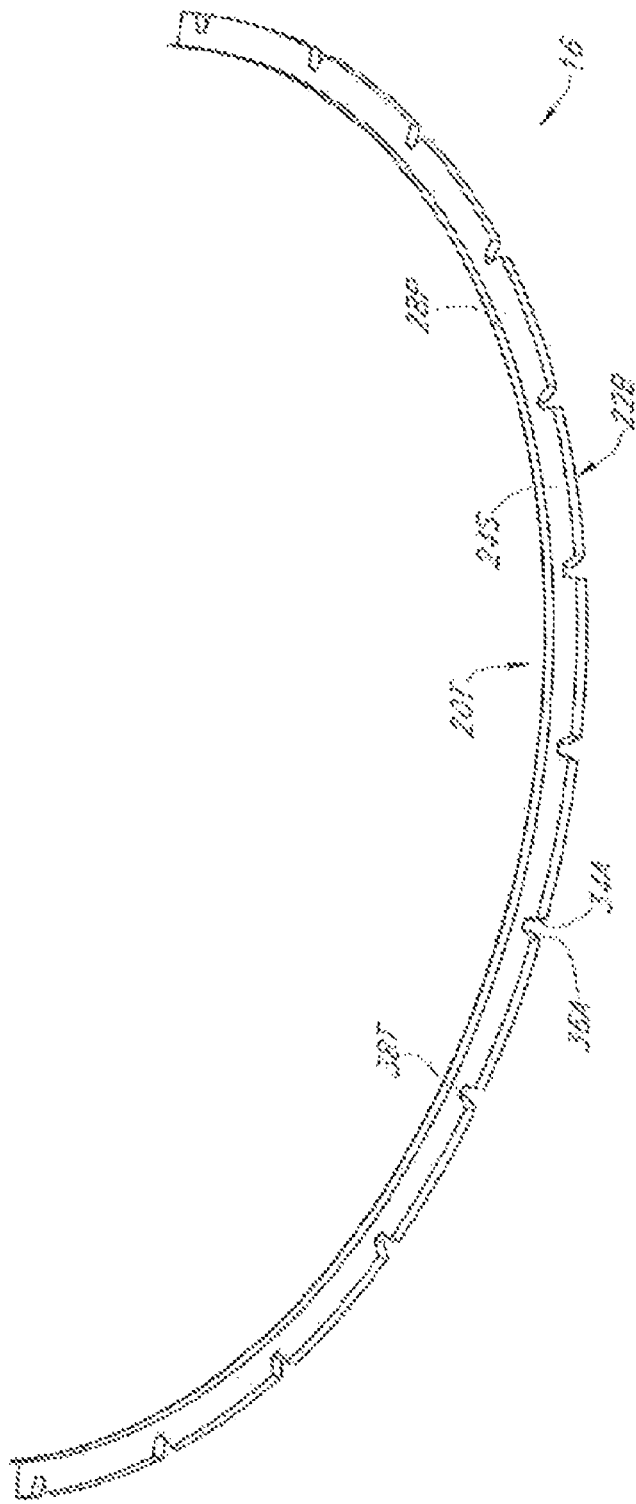
FIG. 2A is a perspective view of a frame used in the assembly of a support system, according to an embodiment.

Attention is directed to FIGS. 2A and 2B, which show frame 16. Frame 16 may be curved, and have a top surface 20T, a bottom surface 22B, a first side surface 24S, and a second side surface 26S. A first protruding member 28P may extend outward from the top surface 20T above the first side surface 24S (see FIG. 2A), and be generally parallel to the top surface 20T. A second protruding member 30P may extend outward from the bottom surface 22B below the second side surface 26S (see FIG. 2B), and be generally parallel to the bottom surface 22B. While not clearly shown in the figures, another protruding member may extend outward from the top surface 20T above the second side surface 26S, and yet another protruding member may extend outward from the bottom surface 22B below the first side surface 24S.

Each frame 16 may have one or more locking features 32L. The locking features 32L may extend through the bottom surface 22B, and part of the first side surface 24S and the second side surface 26S of the frames 16. The locking features 32L may each include a groove having a first angled surface 34A, a second angled surface 36A, and a top surface 38T that is generally parallel to the top surface 20T of the frame 16. As discussed in more detail below, the locking features 32L of the frames 16 may allow the frames 16 to mate with and be conveniently locked with respect to the stringers 14.

Each frame 16 may, but need not, be made of composite material (e.g., carbon fibre, glass, et cetera, embedded in plastic, metal, ceramic or another matrix), and may be independently fabricated by conventional means. For example, prepreg may be laid between release films upon a bonding tool and cured in an oven or autoclave at high pressure. Each frame 16 when so formed may be fully cured. Alternatively, each frame 16 may be partially cured such that it is at about 80 to 90 percent of its fully cured strength. People of skill in the art will appreciate that a partially cured frame 16 at about 80 to 90 percent of its fully cured strength is stable and may not be easily deformed or distorted. Embodiments where some or all of the frames 16 are made of metal (e.g., aluminum alloys) are also contemplated.

Figure 3:
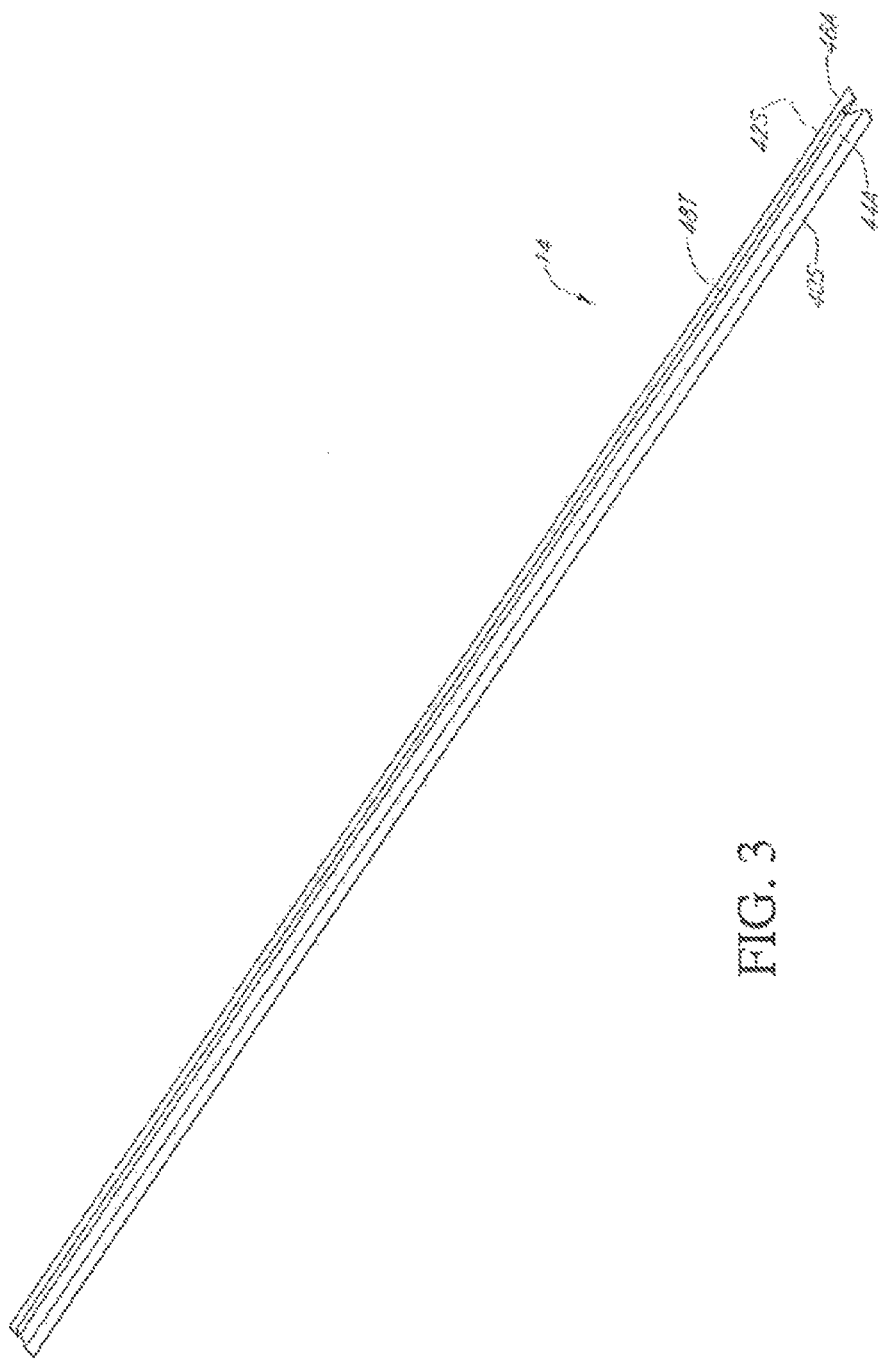
FIG. 3 is a perspective view of a stringer used in the assembly of the support system, according to an embodiment.

FIG. 3 shows the stringer 14. The stringer 14 may have a first side surface 40S, a second side surface 42S, a first angled surface 44A, a second angled surface 46A, and a top surface 48T. The first angled surface 44A may extend from at an angle from the first side surface 40S. The second angled surface 46A may extend at an angle from the second side surface 42S. The top surface 48T may extend between and connect the first and second angled surfaces 44A, 46A. Each stringer 14 may, but need not comprise composite material, and may be fabricated individually. Alternatively, the stringers 14 may be made of metal or metal alloys.

Figure 4:
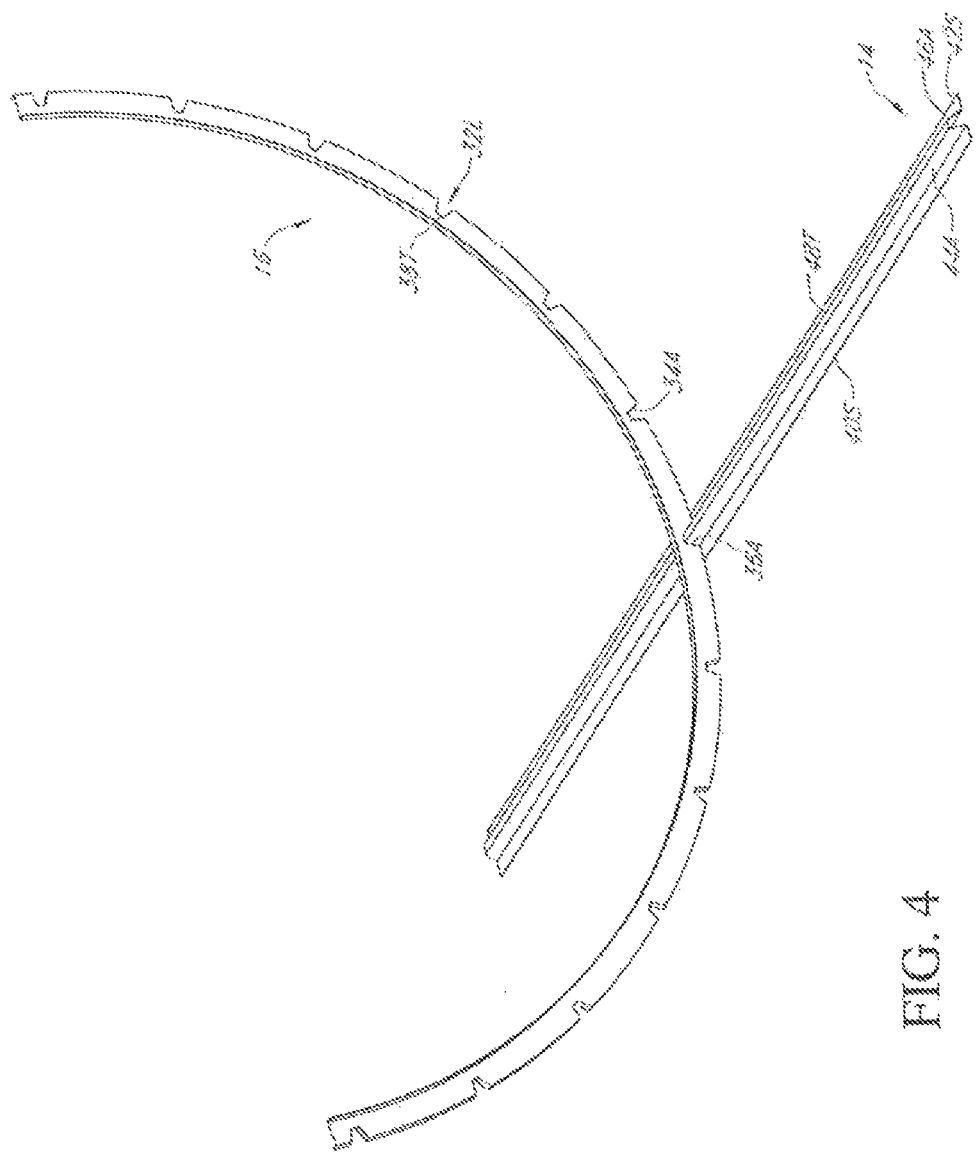
FIG. 4 shows the stringer of FIG. 3 being secured to a locking feature of the frame.

The first and second angled surfaces 44A, 46A of the stringer 14 may be configured such that the stringer 14 can be snugly mated and locked with respect to the frame 16. Specifically, as shown in FIG. 4, the frame 16 may be mated with the stringer 14 such that the first and second angled surfaces 44A, 46A of the stringer 14 are adjacent and contact the second angled surface 36A and the first angled surface 34A of the frame 16, respectively, and the top surface 38T of the locking feature 32L of the frame 16 is adjacent and contacts the top surface 48T of the stringer 14.

Figure 5A:
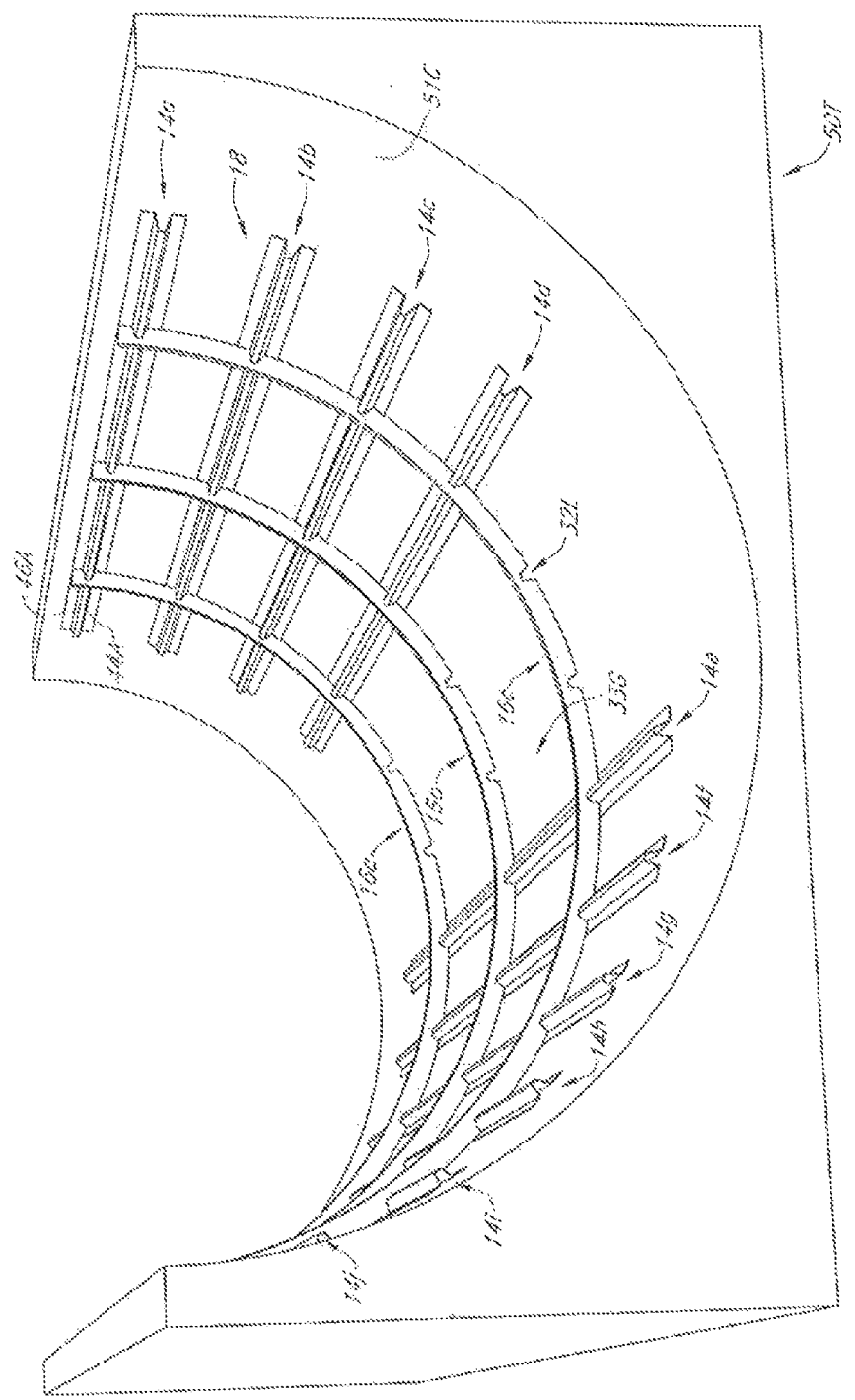
FIG. 5A shows the support system being assembled on a female tool, according to an embodiment.
Figure 5B:
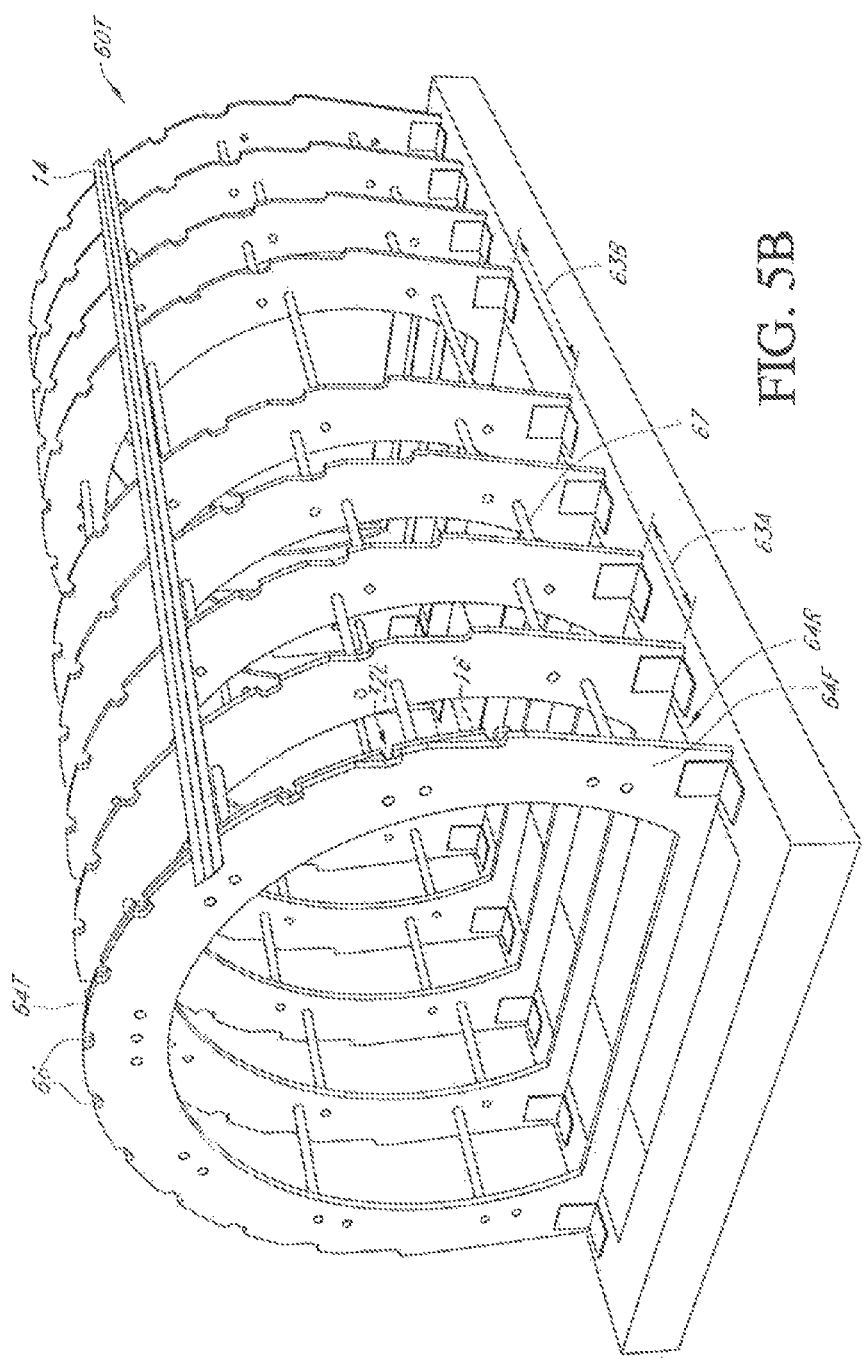
FIG. 5B is a perspective view of a male tool used to form the support system, according to an embodiment.

After fabrication of a plurality of stringers 14 and frames 16, the support system 18 may be assembled fairly effortlessly. Specifically, as shown in FIG. 5, a plurality of frames 16 may be laid on a solitary bonding tool 50T such that one frame 16 is generally parallel to another frame 16, and a distance between two adjacent frames 16 is generally equal to the distance between at least two other adjacent frames 16. In some embodiments, the bonding tool 50T may have a curved bonding surface 51C that corresponds to the inner surface 12I of the skin 12 (i.e., a "female" tool), and the support system 18 may be assembled on the curved surface 51C of the tool 50T. In other embodiments, a different tool (e.g., a male tool as in FIG. 5(b) discussed further below) may be used to assemble the support system 18.

Figure 7:
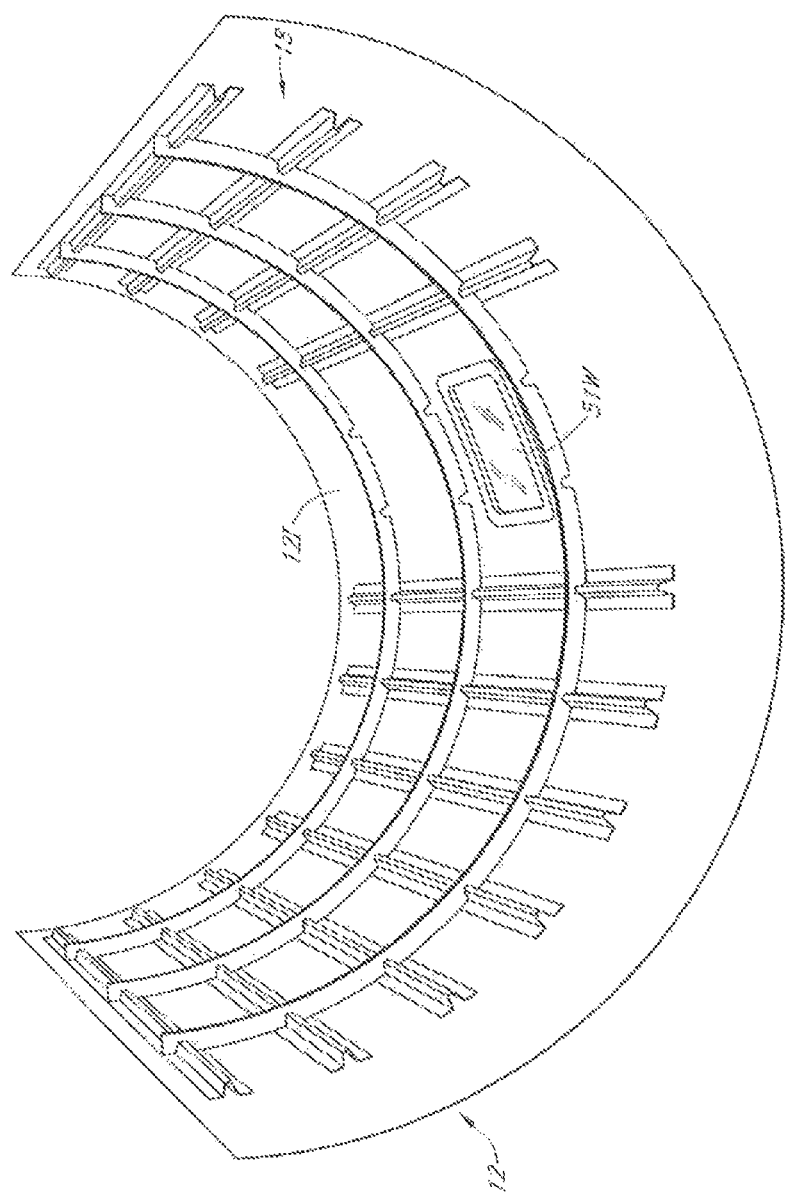
FIG. 7 shows the support system being globally positioned on a skin of an aircraft.

The frames 16 may be laid on the curved surface 51C of the tool 50T such the bottom surfaces 22B of the frames 16 are adjacent the curved surface 51C of the tool 50T. Three frames 16a, 16b, and 16c are shown in FIG. 5; however, people of skill in the art will appreciate that any number of frames 16 (and any other components) may be placed atop the curved surface 51C during assembly of the support structure 18. Stringers 14a-14k may then be passed through some or all of the locking features 32L of each frame 16a, 16b, and 16c. Specifically, the stringer 14a may be slid through the locking feature 32L of the frame 16a such that the first and second angled surfaces 44A, 46A of the stringer 14a are adjacent and in contact with the second angled surface 36A and the first angled surface 34A of the frame 16A, respectively, and the top surface 38T of the locking feature 32L of the frame 16a is adjacent the top surface 48T of the stringer 14. The stringer 14a may then be pushed on the bonding tool 50T and slid through the locking features 32L of the frames 14b and 14c in the same manner. Stringer 14b may then be pushed through the locking features 32L of the frames 16a, 16b, and 16c. The process may be repeated for stringers 14c-14k to assemble the support system 18. The locking features 32L of the frames 16a, 16b, 16c may include adhesive, which, when cured, may ensure that the stringers 14a-14k are unable to move relative to the frames 16a-16c once fabrication of the support system 18 is complete. As can be seen, no stringers 14 may be passed through some of the locking features 32L of the frames 16, thus forming exaggerated gaps 33G between some stringers 14 (e.g., between stringer 14d and stringer 14e). The gaps 33G may allow for subsequent placement of windows 51W (see FIG. 7) and other parts.

Figure 6:
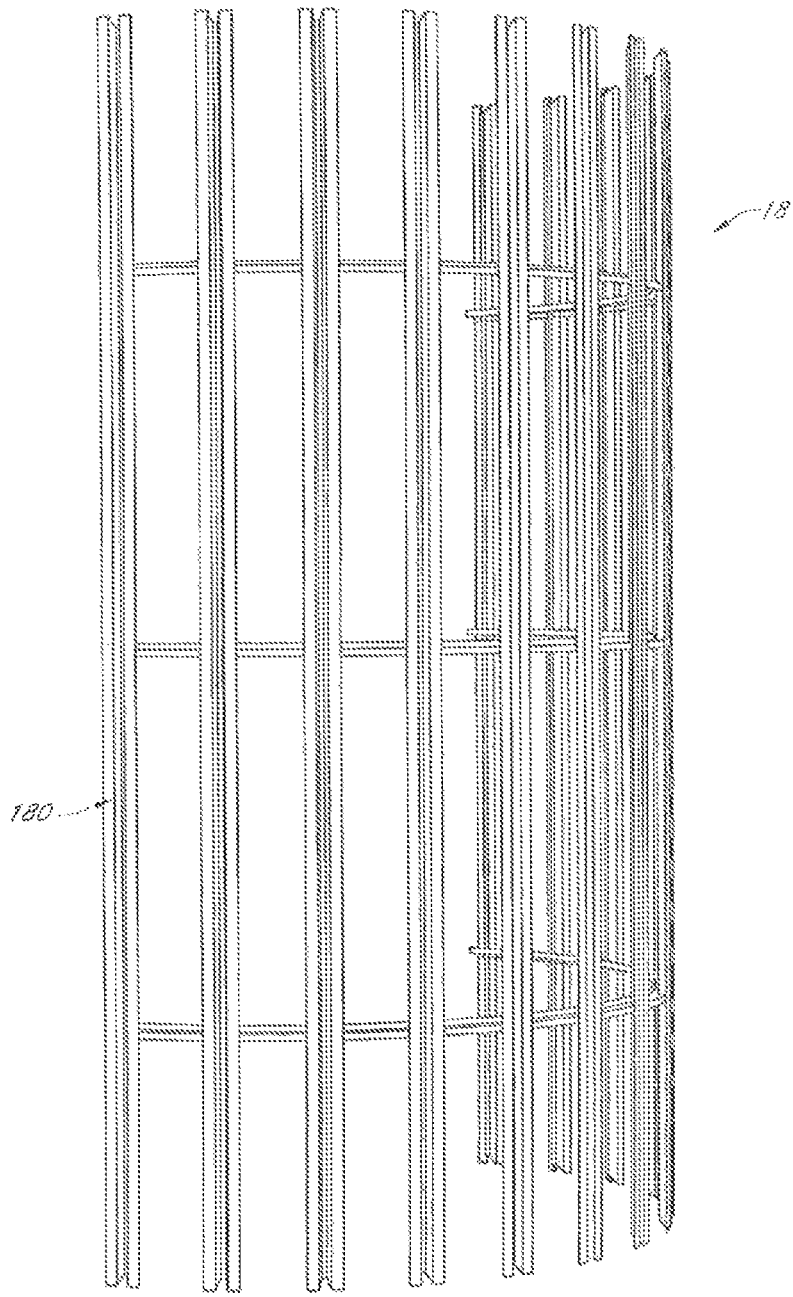
FIG. 6 is a perspective view of the support system removed from the tool.

Once the support system 18 is assembled in this way, it may be transported as a whole and separated from the bonding tool 50T (see FIG. 6). Because the shape of the curved surface 51C of the bonding tool 50T may correspond to the inner surface 12I of the skin 12, the shape of an outer surface 18O of the support system 18 assembled on said tool 50T may also correspond to the inner surface 12I of the skin 12.

The entire support system 18 may then be globally positioned upon the inner surface 12I of an uncured resin pre-impregnated skin 12. Specifically, the support system 18 may be positioned upon the inner surface 12I of the skin 12 such that the outer surface 18O of the support system 18 is adjacent and in contact with the inner surface 12I of the skin 12. The support system 18, which as noted above may be cured or partially cured, and the uncured skin 12, may now be cured together (e.g., in an autoclave or oven) to form the fuselage section 10. The curing of the support system 18 and the skin may cause the support system 18 to become permanently secured to the skin 12.

Figure 8:
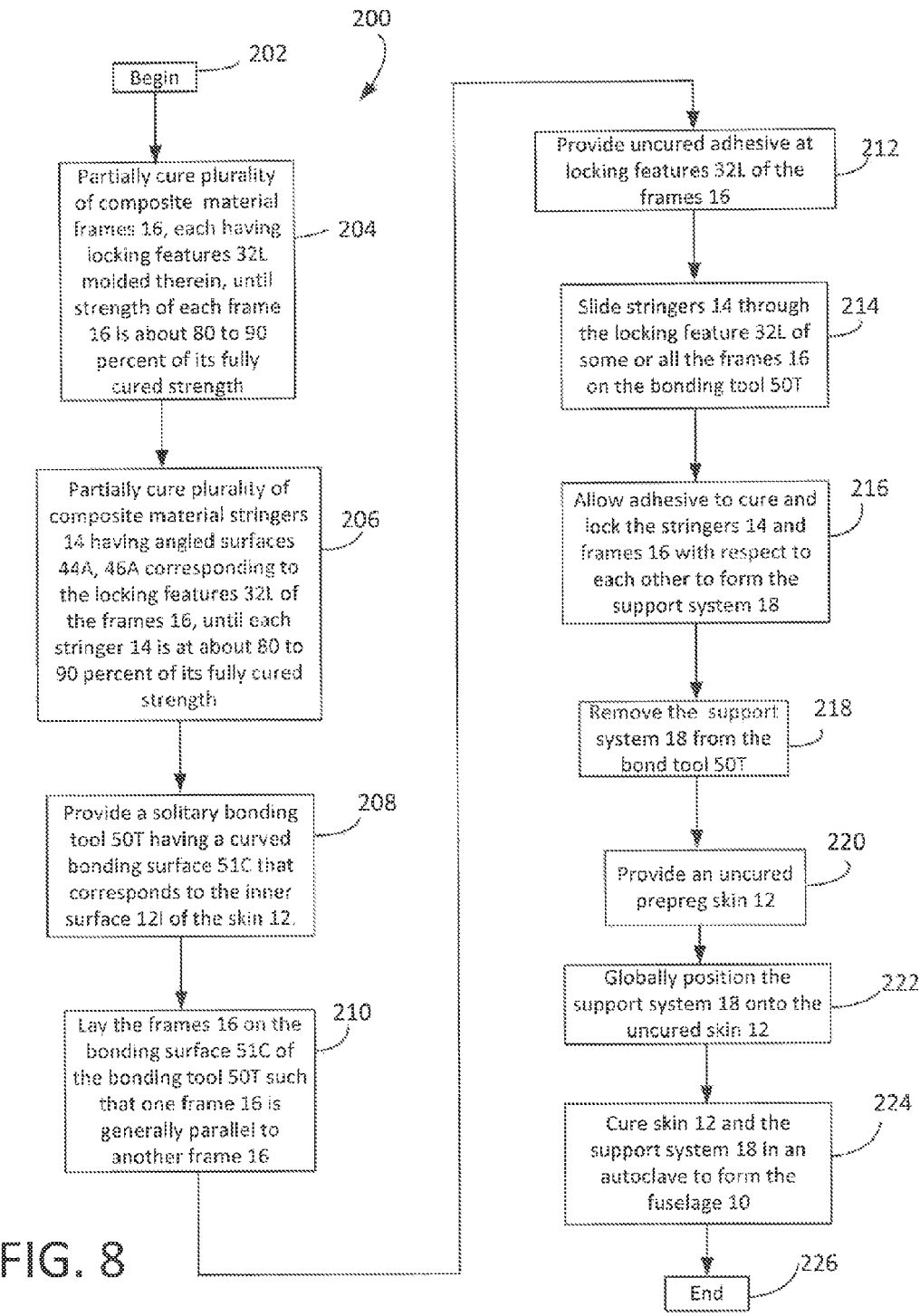
FIG. 8 is a flowchart outlining a method of assembling the fuselage section of FIG. 1, according to an embodiment.

FIG. 8 shows a method 200 for manufacturing and assembling the fuselage 10. The method 200 begins at step 202, and at step 204, a plurality of composite material frames 16, each having locking features 32L molded therein, may be partially cured such that each frame 16 is at about 80 to 90 percent of its fully cured strength. Alternatively, the frames 16 may be fully cured. At step 206, a plurality of composite material stringers 14, each having angled surface 44A, 46A corresponding to the locking features 32L of the frames 16, may be partially cured such that the frames 16 are at about 80 to 90 percent of their fully cured strength. As with the frames 16, the stringers 14 may alternatively be fully cured. People of skill in the art will appreciate that the frames 16 and stringers 14 may be so formed in any order, and that the frames 16 need not be fabricated before the stringers 16.

At step 208, a solitary bonding tool 50T having a curved surface 51C may be provided. The shape of the curved surface 51C of the tool 50T may generally correspond to the shape of the inner surface 12I of the skin 12. At step 210, the frames 16 may be laid on the bonding tool 50T. While not required, the frames 16 may be laid on the curved surface 51C of the tool 50T in a parallel configuration for convenience of subsequent assembly. At step 212, uncured adhesive may be provided adjacent the locking features 32L of the frames 16. Alternatively, the adhesive may be provided at the locking features 32L before the frames 16 are placed on the curved surface 51C.

At step 214, the stringers 14 may be slid on the bonding tool 50T through the locking features 32L of some or all the frames 16. At step 216, the adhesive may be allowed to cure. The cured adhesive may bond the stringers 14 to the frames 16, thus forming the support system 18. The support system 18 may be separated from the bonding tool at step 218, and if required, conveniently transported to another location for assembly with the skin 12.

At step 220, an uncured prepreg skin 12 may be provided. The support system may be globally positioned on the inner surface 12I of the uncured skin 12 at step 222. This step 222 may require minimal or no tooling, as the outer surface 18O of the support system 18 is already configured to correspond to the inner surface 12I of the skin 12. The uncured skin 12, along with the partially (or fully) cured support system 18 placed thereon, may then be cured together in an autoclave (or in an oven, or by other conventional means) to form the fuselage section 10. The method 200 may then end at step 226.

Forming the support system 18 via the solitary bonding tool 50T, and then co-curing the entire support system 18 with the uncured skin 12 at once according to the method 200 may have several advantages over the traditional method of bonding each component 14, 16 to the skin 12 piece by piece. Specifically, the method 200, by allowing the entire support system 18 to be laid atop and cured with the skin 12 together, eliminates the extensive and complex tooling that is otherwise required to bond each stringer 14 and frame 16 to the skin 12 individually. The method 200 also eliminates the need for caul sheets which are conventionally used when bonding individual components 14, 16 to the skin 12. The method 200, thus, by utilizing a solitary and simple bonding tool 50T, saves significant time, labor and material costs as compared to traditional methods of forming the fuselage section 10.

Additionally, the method 200 may result in tighter tolerances at both the inner mold line and the outer mold line. Specifically, variability may be imparted when individual components 14, 16 are bonded to the skin 12 piece by piece, and this variability may result in the production of an inferior or weakened composite fuselage 10. The method 200, by utilizing a single bond tool 50T to form the entire support system 18 together, and by then curing the entire support system 18 with the skin 12 at once, may result in tighter tolerances and less variability. The locking features 32L of the frames 16 may further ensure that the frames 16 and stringers 14 are secured to each other uniformly. The plies of the skin 12 may help minimize any remaining gapping during cure, thus resulting advantageously in a zero bond line on the inner mold line as well as the outer mold line.

Furthermore, various tolerances of the support system 18 may be tested after the support system 18 is assembled on the tool 50T and before it is secured to the skin 12. Any defects in the support system 18, thus, may be remedied where possible before the support system 18 is cured with the skin 12. The strength of the support system 18 may also be tested before it is cured with the skin 12. These quality control steps may provide significant savings in costs of material, as the entire fuselage 10 having the skin 12 need not be scrapped because, for example, strength of the cured fuselage 10 after the components 14, 16 are bonded thereto is below a required threshold.

Adhesive is generally utilized when bonding each component 14, 16 to the skin 12 piece by piece. The method 200 may render unnecessary the use of adhesive for bonding the skin 12 to the support system 18. Specifically, the support system 18 may utilize the prepreg of the uncured skin 12 as an adhesive when being cured therewith. The method 200 may thus save additional costs of materials.

Attention is directed now to FIG. 5(b) which shows a male bonding tool 60T. The male bonding tool 60T may have a plurality of generally semicircular attachment members 62, each having a front surface 64F, a rear surface 64R, and a top surface 64T. Each attachment member 62 may be generally parallel to and be spaced apart from an adjacent attachment member 62. A spacing 63A between two adjacent attachment members 62 may be less than a spacing 63B between two other adjacent attachment members 62.

The top surface 64T of each of the attachment members 62 may have indentations or ridges 66. The ridges 66 of one attachment member 62 may be in line with and correspond to the ridges 66 in the other attachment members 62. The shape of the top surface 64T of the attachment members 62 may generally correspond to the shape of the inner surface 12I of the skin 12. The bonding tool 50T may be made of Masonite, ceramic, plastics, metals, metal alloys, composites, or other desirable materials.

The male bonding tool 60T may be used as an alternative to the female bonding tool 50T to form the support structure 18. To assemble the support structure 18, frames 16 may first be removably secured (e.g., by clamps or fasteners) to the rear surface 64R of the attachment members 62. Specifically, the frames 16 may be clamped to the rear surface 64R of the attachment members 62 such that one of the first side surface 24S and the second side surface 26S of the frames 16 is adjacent the rear surface 64R of the attachment members 62, and the locking features 32L of the frames 16 are adjacent the ridges 66 of the attachment members 62. In some embodiments, the male bonding tool 60T may have connecting members 67 extending between the attachment members 62, and the frames 16 may be placed on the connecting members 67 such that the locking features 32L of the frames 16 are adjacent the ridges 66 of the attachment members 62.

After the frames 16 are removably secured to the attachment members 62, the stringers 14 may be placed within the locking features 32L. Specifically, the stringers 14 may be placed within the locking features 32L of the frames 16 such that the first and second angled surfaces 44A, 46A of the stringers 14 are adjacent and in contact with the second angled surface 36A and the first angled surface 34A of the frames 16, respectively, and the top surfaces 38T of the locking features 32L of the frames 16 are adjacent the top surfaces 48T of the stringers 14. The locking features 32L, as discussed with respect to earlier embodiments, may contain adhesive, which may bond the frames 16 and stringers 14 to each other to form the support system 18.

While the disclosure above notes that the frames 16 are clamped such that they are adjacent the rear surface 64R of the attachment members 62, the frames 16 may also be removably secured to the front surface 64F of the attachment members 62 for subsequent securement of the stringers 14 to the frames 16. In practice, when forming the support system 18, some of the frames 16 may be clamped to the attachment members 62 such that they are adjacent the front surface 64F of the attachment members 62, while other frames 16 may be clamped such that they are adjacent the rear surface 64R of the attachment members 62. People of skill in the art will appreciate that the varying distances (e.g., distances 63A, 63B) between certain frames 16 may allow for the support system 18 to incorporate other parts (e.g., windows 51W).

As discussed above, after the support system 18 is assembled using the female tool 50T, the support system 18 generally has to be transported (or at least inverted) so that the outer surface 18O of the support system 18 can be secured to the inner surface 12I of the skin 12. The male tool 61T may render this step unnecessary. Specifically, as can be appreciated, when the support system 18 is formed on the male tool 60T, the outer surface 18O of the support system 18 faces away from the male tool 60T. The uncured skin 12, thus, may simply be placed atop the support system 18 such that the inner surface 12I of the skin 12 is adjacent and in contact with the outer surface 18O of the support system 18. The uncured skin 12 and the cured or partially cured support system 18 may then be cured together to form the fuselage section 10.

While the support system 18 may be cured or partially cured via conventional means, in some embodiments, the support system 18 may be cured or partially cured using a "fast cure" process, or for example, using an internally heated and pressurized systems. The fast cure process is described in more detail in concurrently filed co-pending U.S. patent application Ser. No. 13/763,416, filed 8 Feb. 2013, and U.S. patent application Ser. No. 13/763,584, filed 8 Feb. 2013. The disclosure of each is incorporated herein by reference in its entirety.

Conventional methods of curing composite structures generally entail, in conjunction with application of high pressure, heating of the prepreg at a rate of about 1 to 8° F. per minute. Faster heating rates are generally avoided as they may result in inconstancies in the composite structures. Depending on the specific composite material, the fiber, and the resin, a cure cycle at a given temperature per such conventional methods generally takes over an hour, and often, over two hours. People of skill in the art will appreciate that the cure time (or the dwell time) represents the time needed to bring the prepreg layers (e.g., those used to form the stringers 14 or frames 16 of the support system 18) from a room temperature to a curing temperature that accelerates the cure process.

Curing of the support system 18 (and other composite structures) via the fast cure process, unlike conventional curing methods, may be effectuated at a rate of 15 to 20° F. per minute, and the support system 18 may achieve about 80% to 90% of its fully cured strength, stiffness, and service temperature capability within twenty to thirty minutes. Specifically, temperature of each component 14, 16 of the support system 18 may be raised rapidly such that it reaches a predefined threshold, and held at the threshold for a cure (or dwell) time. The predefined threshold may be, for example, the glass transition temperature ($T_g$) of the prepreg composite laminate, and is defined as the temperature at which the polymer matrix of the composite material starts cross-linking of the molecules to produce a rigid structure. The $T_g$ temperature may vary depending on properties of the composite material (e.g., its fiber and resin content). In some embodiments, for example, a temperature of about 250° F. may be applied to the prepreg when forming the components 14, 16. In other embodiments, a temperature of about 350° F., between 250° F. and 350° F., or below 250° F. may be applied. The cure time may be shorter for composite materials requiring a relatively lower curing temperature.

It may be acceptable to utilize the fast cure process to partially cure the components 14, 16 of the support system 18 because the support system 18 is subsequently fully cured with the uncured skin 12. Partially curing the support system 18 with the fast cure process, may yield significant time savings as compared to partially or fully curing the support system 18 with traditional methods. Nevertheless, both methods may provide notable improvements over the prior art wherein each component 14, 16 is individually positioned upon and bonded to the skin 12.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for making a fuselage section, the method comprising steps:
   (a) assembling a support system comprising fiber reinforced composite material, the support system including at least three frames and six stringers;
   (b) partially curing the support system via a fast cure process such that the support system attains about eighty percent of its fully cured strength;
   (c) globally positioning a skin comprising uncured fiber reinforced composite material such that an inner surface of the skin corresponds to an outer surface of the support system; and
   (d) fully curing the skin and the support system together;
   wherein the support system is assembled on a bonding tool having a bonding surface corresponding to an inner surface of the skin;
   wherein each of the three frames includes a plurality of locking features to facilitate securement of the three frames to the six stringers.

2. The method of claim 1, further comprising the step of conducting quality control testing on the support system before the uncured skin is positioned thereon.

3. The method of claim 2, wherein the tool is a male tool.

4. The method of claim 3, wherein the male tool comprises at least a first attachment member, a second attachment member, and a third attachment member; and wherein:
   the first attachment member is adjacent the second attachment member and connected thereto by a plurality of first connecting members;
   the second attachment member is adjacent the third attachment member and connected thereto by a plurality of second connecting members;
   a distance between the first and the second attachment members is different from a distance between the second and the third attachment members.

5. The method of claim 4, wherein each attachment member comprises Masonite.

6. The method of claim 2, wherein the tool is a female tool having an outer surface configured to correspond to an inner surface of the skin.

\* \* \* \* \*